United States Patent [19]

Cosgrove et al.

[11] Patent Number: 4,765,716

[45] Date of Patent: Aug. 23, 1988

[54] PHOTOGRAPHIC CONTROL DEVICE

[75] Inventors: Patrick A. Cosgrove; Michael T. Wolf, both of Rochester, N.Y.

[73] Assignee: Eastman Kodak Company, Rochester, N.Y.

[21] Appl. No.: 900,551

[22] Filed: Aug. 26, 1986

[51] Int. Cl.⁴ .................. G02B 26/02; G02B 5/22; G03B 31/00; G03B 27/32

[52] U.S. Cl. ..................... 350/273; 350/315; 354/15; 355/32; 355/35

[58] Field of Search .............. 350/311, 315, 317, 318, 350/273, 272, 274, 275; 354/15; 355/32, 35

[56] References Cited

U.S. PATENT DOCUMENTS

| | | | |
|---|---|---|---|
| 3,704,655 | 12/1972 | Fryklund et al. | 354/15 |
| 3,836,928 | 9/1974 | Koleff et al. | 355/32 |
| 3,959,800 | 5/1976 | Friedel | 354/15 |
| 4,236,817 | 12/1980 | Hofstetter | 355/68 |
| 4,405,206 | 9/1983 | Ekholm | 350/317 |

FOREIGN PATENT DOCUMENTS 515651 of 1955 Italy ..................... 350/317

Primary Examiner—John K. Corbin
Assistant Examiner—Ronald M. Kachmarik
Attorney, Agent, or Firm—James A. Smith

[57] ABSTRACT

A photographic control device for scanner and exposure control system calibration in a photographic printer includes a carrier disk to present an open scan aperture in the scan gate for normal printer operation, and selectively a plurality of control patches in the scan gate for calibration of the scanner at startup. The disk is driven by a stepping motor and timing belt, the disk position being controlled by a position sensor tied in with the drive motor. The disk is mounted by three rotatable bearings spaced around its periphery.

10 Claims, 2 Drawing Sheets

PHOTOGRAPHIC CONTROL DEVICE

BACKGROUND OF THE INVENTION

1. Field of the Invention

The present invention relates to a high speed photographic printer, and more specifically to a photographic control device for scanner and exposure control system calibration in a photograhic printer. It includes automatic algorithm printing matrix modification by regression analysis of prints made through the control filters when they are positioned at the scan aperture.

2. Description of the Prior Art

In the photofinishing industry, it is common practice to splice, end-to-end, many individual film strips, the negatives from many customers' cameras. The spliced film strips are wound or spooled on a relatively sizable reel and placed on a photographic printer for automatic or semi automatic projection and printing of each negative on a continuous roll of photosensitive photographic print material.

For calibration of the scanner and exposure control system in such printers, the prior art was effectively a linear transportation of control material through the printer for both scanner calibration and printer control. Later, the function of scanner calibration was accomplished by placing known density material on a solenoid and pulling or rotating this material in and out of the light path which was used to scan negatives. This data was then used to optimize the scanner by providing appropriate offsets which represented variations in scanning systems. These offsets were subsequently used to measure true relative variance in customer negatives, which allowed for automatic printing. The paper variables were calculated based on densitometer differences of a series of uniquely exposed patches printed at default values. The density values obtained after processing were evaluated and appropriate corrections were input manually to compensate for speed and color response variations within emulsions.

SUMMARY OF THE INVENTION

The present invention may be summarized as a photographic control device for calibration of a scanner and exposure control system in a photographic printer. It includes a rotatable carrier disk having diametrically opposed scan and print apertures which are in registry respectively with a scanning head and printer optics in a photographic printer during normal operation of the printer. The carrier disk also includes a number of patch apertures, each for mounting a control patch. For calibration of the scanner, the carrier disk is rotatable to selectively position these patch apertures in registry with the scanner and the exposure optics. The disk drive is programmed to automatically find a home or operating position and to place the various patches in their positions before the scanner and exposure control system for calibration.

The central idea is an automated system that moves a set of standard patches in such a way as to be seen by both the scanner optical path and the printing optical path. Thus, the scanner is controlled, monitored, and calibrated based upon the same automatically positioned test patches as is the photographic exposure control system. This allows for independent calibration of the scanner, and also allows for the inclusion of the final calibrated scanner response into the photographic exposure control system calibration.

DRAWING

DESCRIPTION

Figure 1:
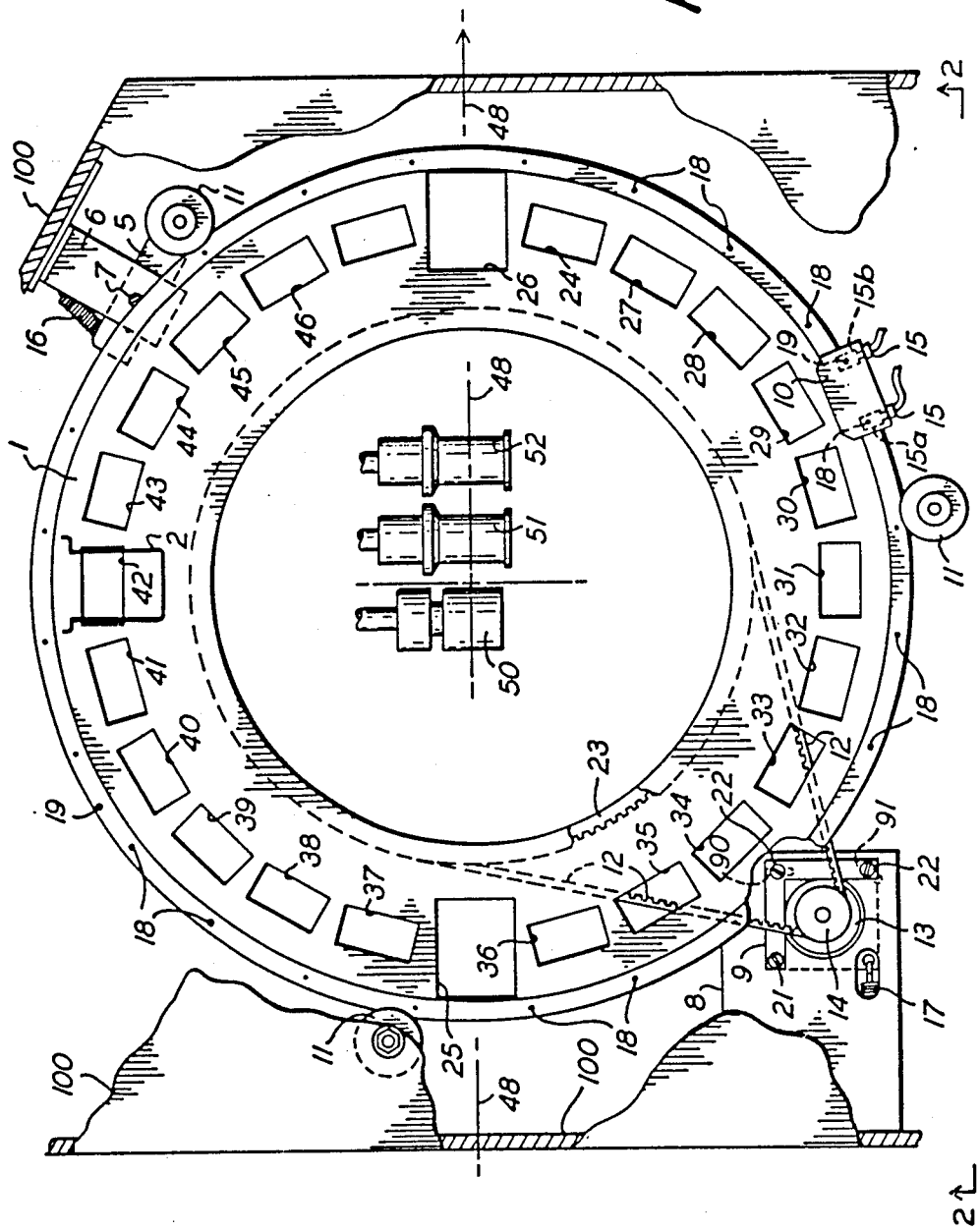
FIG. 1 is a top plan view of the photographic control device of this invention.
Figure 2:
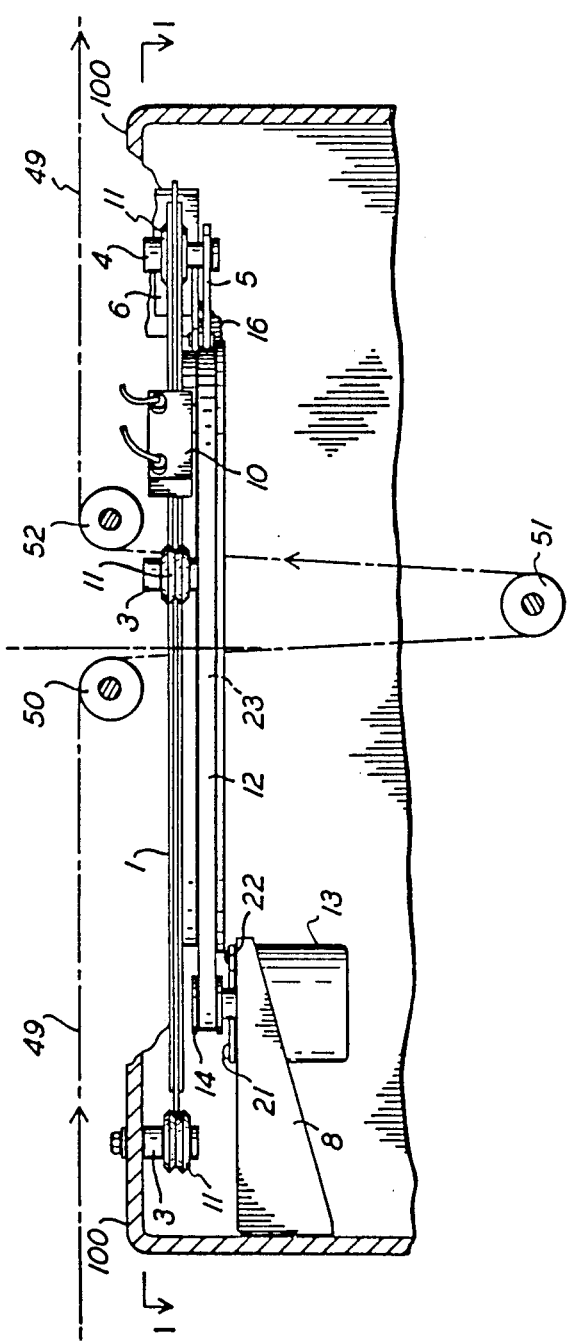
FIG. 2 is a partial front elevation view of the apparatus of FIG. 1.

Referring to the drawing, the photographic control device of this invention includes a mounting frame 100 supporting two fixed bearing studs 3 and a third pivot bearing stud 4, these bearing studs each rotatably supporting a V-groove bearing 11. The three V-groove bearings 11 in turn support a carrier disk 1 which is a turnable rotatable on the three V-groove bearings. The three bearings 11 are located at roughly equal angular spacing around the periphery of the carrier disk 1 to provide stable 3-point mounting for the disk in a plane parallel to the film plane 49 along which film moves through this device for printing.

Pivot bearing stud 4 and its V-groove bearing 11 are mounted on a bearing pivot bracket 5 which is in turn pivotally supported on a support bracket 6 by means of a pivot shaft 7. Support bracket 6 is fixed to the frame 100. A tension spring is connected to the support bracket 6 and to the pivot bracket 5 to urge the V-groove bearing 11 carried by stud 4 into releasable engagement with the periphery of the carrier disk 1 to permit removal of the disk from the bearings 11 and from the device.

A motor bracket 8 is fixed to the frame 100. A tapping plate 9 is mounted by a pivot screw 21 and by clamp screws 22 to the motor bracket 8. Tapping plate 9 is normally held tight to bracket 8, but when clamp screws 22 are loosened, by virtue of the arcuate apertures 90 and 91 in plate 9 through which they pass, tapping plate 9 is pivotable about pivot screw 21. A drive motor 13 with a drive pulley 14 fixed to its shaft is mounted on the tapping plate 9. A drive and timing belt 12 is operatively connected to the drive pulley 14 and to a driven sprocket 23 which is integral with the carrier disk 1. The purpose of the tapping plate 9 and its pivotable mount on bracket 8 is to periodicaly adjust or maintain proper tension on the timing belt 23. This is done by loosening the clamp screws 22 and allowing the tapping plate to pivot slightly under the influence of a tension spring 17 which is connected to motor mounting bracket 8 and tapping plate 9. When this is done, and the proper belt tension achieved, the clamp screws 22 are again tightened so that the motor mount is firmly set.

A sensor mounting bracket 10 is also fixed relative to the frame 100. A positive sensor 15 is mounted on mounting bracket 10 for operative engagement with the periphery of carrier disk 1. Sensor 15 includes a pair of sensing heads 15a and 15b which embrace the disk periphery. Sensor head 15a is operative at an inner circumference at which a number of sensor holes 18 are arranged around that inner circumference. Sensor head 15a is shown in registry with one of them. Home sensor head 15b is operative at a slightly larger circumference at which only two home sensor holes 19 are placed, these being diametrically opposd on that circumference. Home sensor head 15b is shown in registry with one of them.

The carrier disk 1 includes a scan aperture 25 and a diametrically opposed print aperture 26, these two apertures lying in the path 48 of film travel during normal operation of the printer apparatus. Film passes from left to right through this apparatus, over the top of the disk, in path 48 and in film plane 49. After passing over the scan aperture 25, the film passes over a drive roller 50, then under and over two tension rollers 51 and 52 respectively, and over the print aperture 26 and onward to the right.

Carrier disk 1 also includes some twenty-two additional patch apertures 24 around the disk circumfernce. A control patch or filter, designated by numerals 27 through 46, is placed in each of these patch apertures 24 except for two apertures which are blank. Each of the patches 27–46 are held in place in the apertures by suitable mounting and fastening means such as for example a spring clip 2. The patches are each sandwiched between optical glass plates cemented together. This provides for their protection and permits their cleaning.

Drive motor 13 is a software controlled stepping motor. A presently preferred drive electronics consists of a 1.8 degree, 200 step step motor driven with a 60,000 chopper board. With this arrangement the time to advance one pitch, ie. from one patch to the next on disk 1, is approximately 0.20 seconds. The position sensor 15 provides incremental position sensing. There are two home positions of the disk, at which apertures 25 and 26 are in registration under the scan and print gates for normal print operation (since these two apertures are identical, it makes no difference if they are in the positions shown in FIG. 1 or rotated 180 degrees). The drive motor will index a fixed number of steps for each pitch of the disk, and then the sensor 15 will verify that one of the patches is in the scan or print gate. At any time after the motor has stopped and the sensor 15b does not see a home sensor hole 19, a "seek home" command will be initiated. If, after one disk revolution, no home is sensed a "home failure" signal will be given. On startup, the software program will initiate a search for a sensor hole 18 to initialize center position before it seeks one of the home positions. It will do this by finding the leading and trailing edge of successive sensor holes and dividing by two to determine the midpoint between them which corresponds to the midpoint of a patch. The program will then go to a home position.

The benefits derived from this invention include:

1. There is minimal operator involvement; the system operates automatically. Thus, there is no handling damage to the patches. In addition, because they are not handled extensively, the life of the patches is extended because they are exposed to light only during calibration.

2. Service and cleaning of the patches is easily accomplished by simple removal of the disk.

3. The same standard patches are sequentially placed in both the scan gate and the print gate, and are used over and over from calibration to calibration and from print test to print test.

The foregoing is a description of one embodiment of the present invention, which embodiment is the best mode presently contemplated by the applicant. Modifications may occur to others which will remain within the concept and scope of the invention. It is therefore intended that the invention be not limited by the details with which it has been described buy only by the purview of the following claims and equivalents thereof.

What is claimed is:

1. A photographic control device for scanner and exposure control system calibration in a photographic printer, including:
   a rotatable carrier disk having a plurality of apertures around its circumference, a number of said apertures adapted to mount a control patch therein, and
   a drive motor and a position sensor operatively connected to said carrier disk to rotate said disk selectively among a plurality of positions for selective placement of diametrically opposed apertures in operative positions relative to said scanner and said exposure control system respectively.

2. A photographic control device as defined in claim 1 in which said carrier disk includes an integral sprocket and is operatively connected to said drive motor by a timing belt.

3. A photographic control device as defined in claim 2, further including means to maintain tension in said timing belt.

4. A photographic control device as defined in claim 1 in which said carrier disk is supported for rotation by a plurality of rotatable bearings spaced around the periphery of said disk.

5. A photographic control device as defined in claim 4 in which one of said bearings is spring-biased against the periphery of said disk to maintain the position of said disk and to permit removal of said disk from said device.

6. A photographic control device for scanner and exposure control system calibration in a photographic printer, including:
   a rotatable carrier disk having a plurality of apertures around its circumference, one of said apertures being an open scan aperture and one of said apertures being an open print aperture, the remaining of said apertures adapted to mount a control patch therein, and
   means for rotating said carrier disk incrementally to selectively position one of said apertures in operative position relative to said scanner and the diametrically opposed one of said apertures in operative position relative to said exposure control system.

7. A photographic control device for scanner and exposure control system calibration in a photographic printer, including:
   a rotatable annular carrier disk defining an open center and a plurality of control patch apertures spaced around its circumference, and
   a drive motor and a position sensor operatively connected to said carrier disk to rotate said disk selectively among a plurality of positions for selective placement of diametrically opposed apertures in operative positions in the film path through said device relative to said scanner and said exposure control system respectively.

8. A photographic control device as defined in claim 7 further including film drive and tensioning means operative in said open center of said carrier disk.

9. A photographic control device for scanner and exposure control system calibration in a photographic printer, including:
   a rotatable annular carrier disk defining an open center and a plurality of apertures around its circumference, one of said apertures being an open scan aperture and one of said apertures being an open print aperture, the remaining of said apertures adapted to mount a control patch therein, and means for rotating said carrier disk incrementally to selectively position one of said apertures in operative position in the film path through said device relative to said scanner, and the diametrically opposed one of said apertures in operative position in the film path through said device relative to said exposure control system.

10. A photographic control device as defined in claim 9 further including film drive and tensioning means operative in said open center of said carrier disk.

* * * * *

UNITED STATES PATENT OFFICE
CERTIFICATE OF CORRECTION

PATENT NO. : 4,765,716
DATED : August 23, 1988
INVENTOR(S) : Patrick A. Cosgrove and Michael T. Wolf It is certified that error appears in the above-identified patent and that said Letters Patent are hereby corrected as shown below:

| | |
|---|---|
| Column 2, Line 17 | Before the word "rotatable", "turnable" should be spelled --turntable--. |
| Column 2, Line 27 | After the word "spring", the numeral "16" was omitted. |
| Column 2, Line 45 | After the word "to", "periodicaly" should be spelled --periodically--. |
| Column 2, Line 65 | After the word "diametrically", "opposd" should be spelled --opposed--. |
| Column 3, Line 12 | After the word "disk", "circumfernce" should be spelled --circumference--. |

Signed and Sealed this

Twenty-first Day of March, 1989

Attest:

DONALD J. QUIGG

Attesting Officer

Commissioner of Patents and Trademarks

UNITED STATES PATENT OFFICE
CERTIFICATE OF CORRECTION

PATENT NO. : 4,765,716
DATED : August 23, 1988
INVENTOR(S) : Patrick A. Cosgrove and Michael T. Wolf It is certified that error appears in the above-identified patent and that said Letters Patent is hereby corrected as shown below:

Column 3, Line 23    After the number "200", the words "step step" should be replaced with the word --step--.

Column 3, Line 66    After the word "described", the word "buy" should be replaced with the word --but--.

Signed and Sealed this

Twenty-seventh Day of June, 1989

*Attest:*

DONALD J. QUIGG

*Attesting Officer*    *Commissioner of Patents and Trademarks*